(12) United States Patent
Metzler et al.

(10) Patent No.: US 11,313,677 B2
(45) Date of Patent: Apr. 26, 2022

(54) AUTOMATED SURVEYING OF REAL WORLD OBJECTS

(71) Applicant: HEXAGON TECHNOLOGY CENTER GMBH, Heerbrugg (CH)

(72) Inventors: Bernhard Metzler, Dornbirn (AT); Michal Pawel Pryczek, Lodz (PL)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 250 days.

(21) Appl. No.: 16/200,326

(22) Filed: Nov. 26, 2018

(65) Prior Publication Data
US 2019/0178643 A1  Jun. 13, 2019

(30) Foreign Application Priority Data
Dec. 11, 2017 (EP) ..................... 17206313

(51) Int. Cl.
*G01C 11/02* (2006.01)
*G06N 3/04* (2006.01)
(Continued)

(52) U.S. Cl.
CPC ............ *G01C 11/025* (2013.01); *G01C 11/04* (2013.01); *G01C 15/002* (2013.01); *G06K 9/6256* (2013.01); *G06N 3/0454* (2013.01); *G06T 17/00* (2013.01); *G06T 17/05* (2013.01); *G06V 20/20* (2022.01); *G06V 20/64* (2022.01);
(Continued)

(58) Field of Classification Search
None
See application file for complete search history.

(56) References Cited

U.S. PATENT DOCUMENTS 5,388,342 A  2/1995  Garau et al.
5,402,582 A  4/1995  Raab
(Continued)

FOREIGN PATENT DOCUMENTS

DE   43 25 337 A1   2/1994
DE   43 25 347 A1   2/1994
(Continued)

OTHER PUBLICATIONS

European Search Report dated Jun. 5, 2018 as received in Application No. EP 17 20 6313.

*Primary Examiner* — Ricky Chin
(74) *Attorney, Agent, or Firm* — Maschoff Brennan

(57) ABSTRACT

A method for automatic surveying of a real word object by a surveying or metrology instrument. It comprises an acquiring of a picture by the surveying or metrology instrument, which picture is comprising the real world object to be surveyed, and an automatic detecting and classifying of the detected real world object to be surveyed in the picture, and also an automatic surveying of the detected real world object by the surveying or metrology instrument for determining a location and/or a geometrical property of the real world object. The automatic detecting and classifying is done with a classifier based on data acquired by machine learning, which machine learning is based on machine learning training data derived from a virtual digital 3d-model which is representing the real world object and which comprises meta information of this 3d-model.

12 Claims, 8 Drawing Sheets

(51) Int. Cl.
*G06K 9/62* (2022.01)
*G01C 11/04* (2006.01)
*G06T 17/00* (2006.01)
*G06V 20/20* (2022.01)
*G06V 20/64* (2022.01)
*G01C 15/00* (2006.01)
*G06T 17/05* (2011.01)

(52) U.S. Cl.
CPC ......... *G06T 2207/20081* (2013.01); *G06T 2215/16* (2013.01); *G06V 2201/07* (2022.01)

(56) References Cited

U.S. PATENT DOCUMENTS

| | | | |
|---|---|---|---|
| 8,730,238 B2* | 5/2014 | Salemann | G06T 17/00 345/424 |
| 9,995,567 B2* | 6/2018 | Pettersson | G01B 11/002 |
| 10,176,382 B1* | 1/2019 | Owechko | G06K 9/6289 |
| 10,690,772 B2* | 6/2020 | Van Voorst | F41H 11/02 |
| 2007/0104353 A1 | 5/2007 | Vogel | |
| 2008/0205707 A1* | 8/2008 | Braunecker | G01S 17/08 382/106 |
| 2009/0024342 A1 | 1/2009 | Hertzman et al. | |
| 2009/0147319 A1 | 6/2009 | Becker et al. | |
| 2010/0134596 A1 | 6/2010 | Becker | |
| 2011/0002531 A1 | 1/2011 | Heisele et al. | |
| 2011/0285592 A1* | 11/2011 | Green | G01S 13/74 342/451 |
| 2014/0079314 A1* | 3/2014 | Yakubovich | G06K 9/6227 382/159 |
| 2015/0176991 A1 | 6/2015 | Maruyama | |
| 2015/0178383 A1 | 6/2015 | Corrado et al. | |
| 2015/0268058 A1* | 9/2015 | Samarasekera | G08G 5/0073 701/409 |
| 2016/0146604 A1* | 5/2016 | Metzler | G01C 21/20 33/228 |
| 2017/0061966 A1* | 3/2017 | Marcheret | G06K 9/00718 |
| 2017/0169313 A1 | 6/2017 | Choi et al. | |
| 2017/0169620 A1 | 6/2017 | Bleiweiss et al. | |
| 2017/0185872 A1 | 6/2017 | Chakraborty | |
| 2017/0220887 A1* | 8/2017 | Fathi | G06K 9/00201 |
| 2017/0236013 A1* | 8/2017 | Clayton | G06N 5/046 382/104 |
| 2017/0374342 A1* | 12/2017 | Zhao | H04N 13/128 |
| 2018/0012082 A1* | 1/2018 | Satazoda | G06K 9/00805 |
| 2018/0299534 A1* | 10/2018 | LaChapelle | H04N 5/232 |
| 2018/0314921 A1* | 11/2018 | Mercep | G01S 13/87 |
| 2020/0201351 A1* | 6/2020 | Armstrong-Crews | G01S 13/931 |
| 2020/0394770 A1* | 12/2020 | Roulet | H04N 5/23238 |
| 2021/0056678 A1* | 2/2021 | Al Shehri | G06N 20/20 |
| 2021/0105435 A1* | 4/2021 | Ritchey | G06N 3/084 |
| 2021/0110605 A1* | 4/2021 | Haslam | G06K 9/4642 |
| 2021/0192783 A1* | 6/2021 | Huelsdunk | G06T 1/60 |
| 2021/0295594 A1* | 9/2021 | Sinha | G06N 3/04 |

FOREIGN PATENT DOCUMENTS

| | | |
|---|---|---|
| DE | 20 2006 005643 U1 | 7/2006 |
| EP | 1 474 650 B1 | 6/2007 |
| EP | 1 836 457 B1 | 6/2013 |
| EP | 2 569 596 B1 | 7/2014 |
| EP | 3340106 A1 | 6/2018 |

* cited by examiner

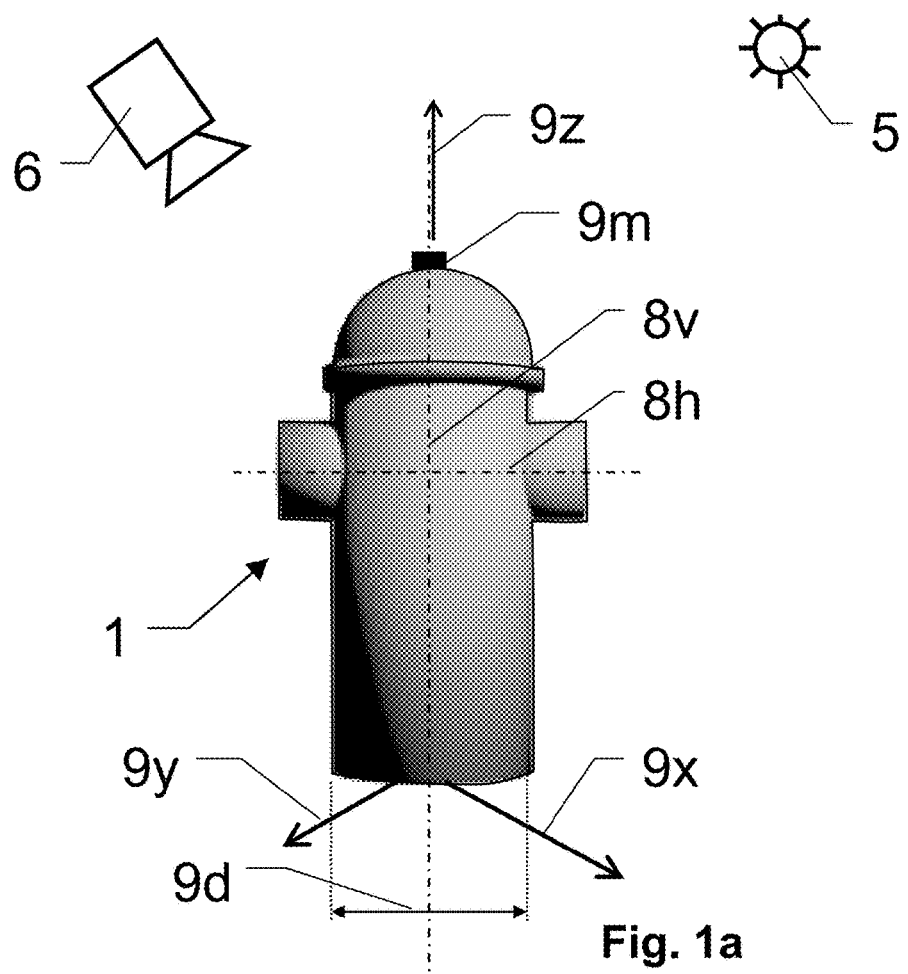
Fig. 1a
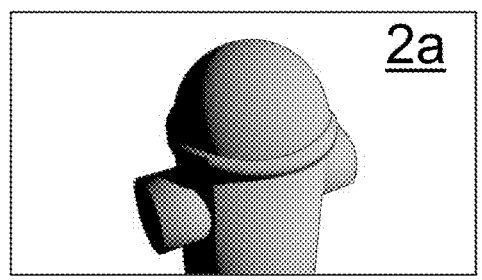
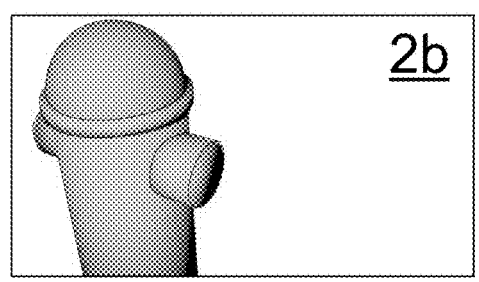
Fig. 1b
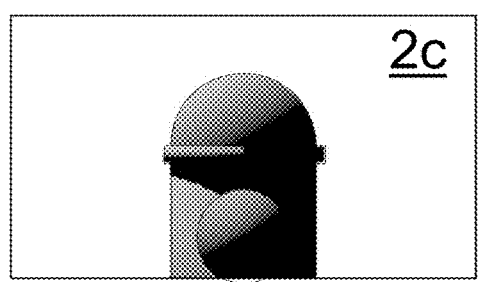
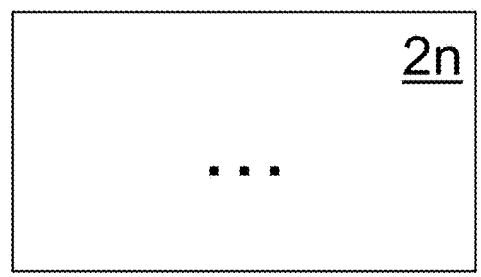

AUTOMATED SURVEYING OF REAL WORLD OBJECTS

CROSS-REFERENCE TO RELATED APPLICATIONS

This application claims priority to European Patent Application No. 17206313.3, filed on Dec. 11, 2017. The foregoing patent application are incorporated herein by reference.

FIELD OF INVENTION

The present invention relates generally to a method for automatic surveying of a real word object and to a corresponding method of machine learning a surveying instrument, as well as to the corresponding instruments.

BACKGROUND

The present invention relates to surveying and metrology by measuring devices. For example, those devices can be geodetic instruments like theodolites, tachymeters, total stations, etc., e.g. as exemplary described in US 2015/176991, EP 1 836 457, US 2007/104353 or US 2009/024342. Those devices can also be metrology systems like coordinate measurement machines, articulated arms, lasertrackers, etc. (e.g. as exemplary described in DE 43 25 337, DE 43 25 347, U.S. Pat. No. 5,402,582 or EP 1 474 650) or those can be 3D-modeling devices like laser scanners, RIM-cameras, structured light digitizers, Stereo-camera arrangements, etc. (e.g. as exemplary described in US 2009/147319 or DE 20 2006 005643).

In such surveying or metrology, the measuring device has to be aligned with the targeted measuring object. For example, in geodetic surveying with a total station, in particular but not only when the target object is measured directly and without aid of a surveying pole, ATR-reflectors or the like—the precise alignment of the aiming unit (e.g. the total station telescope) to the target object is carried out manually by the user. Such can be done by adjusting the aiming unit until a crosshairs or the like aligns with the target object which has been chosen and identified by the user, either by an optical telescope or on a display. In coded surveying this also involves an assignment of a type code to the target object, which is also done manually, e.g. by selection of an object type from a menu list or entering a type information.

In the example of metrology, a workpiece or part to be measured is aligned with respect to a coordinate measurement machine in a manual process. The user first has to select the part as object to be measured from a menu and thereupon measure a set of reference points manually. Based on those reference points the relative position of the part with respect to the machine is determined and the corresponding measuring program for this part can then be started in knowledge of the parts location.

Such manual interaction can be time consuming and brings much labor, mostly to be done by specially trained experts. It is therefore an object to improve the measurement process in view of this.

In theory and academic prototypes, there are machine learning approaches known, which—at least try to—identify objects within pictures. For example, the picture content can be represented in a vector space, e.g. as a Fisher Vector (FV) or vector of locally aggregated descriptors (VLAD) and classified using various classification techniques like Support Vector Machines, decision trees, gradient boosted trees, random forests, neural networks, including deep learning approaches like convolutional neural networks, as well as various instance-based techniques like k-nearest-neighbors, US 2015/0178383, US 2017/0185872, US 2017/0169313. In order to detect and/or localize objects in a larger scene, variants of region proposing methods can be used, e.g. Sliding Window/Shapes, R-CNN variants, semantic segmentation based techniques, etc. In object detection, recognition and classification, additional modalities like thermal-imager-pictures and especially depth-image pictures, etc. can be used directly, e.g. Sliding Shapes, or as additional image channel. In order to train such an algorithm for object detection and/or recognition within image data by means of machine learning, it is required to do a burdensome acquisition and annotation of a large training image dataset representing the objects of interest. Examples of known online resources for real world picture training datasets are PASCAL VOC, IMAGENET, etc. For achieving good results in machine learning, the training dataset has to cover a large variability of the objects, e.g. seen from different viewing angles, in different light conditions, etc. For this purpose hundreds to thousands of images for each object class have to be acquired and manually annotated, i.e. by marking the object within the image and assigning the corresponding class or type of the object—which is a burdensome and time consuming task. For example, there are huge projects and online databases (like e.g. image-net.org, deeplearning.net, LabelMe, etc.) which try to achieve such.

BRIEF DESCRIPTION

It is therefore an object of some embodiments to improve a surveying or metrology instrument, in particular to improve its use and its autonomy or to make the measurements less error-prone. Therein, a semi-automatic or automatic detection and/or classification of a target object which can be measured can be comprised.

It is in particular an object to implement machine learning or deep learning approaches in such an instrument. Therein it can be a specific object to improve the training of such a machine learning approach, e.g. to cover a lager number, wider range and/or more variations of training data.

It is also an object to improve a tagging of the training data with meta information to be included in the training, in particular to achieve an automatic tagging. Therein it can be a specific object to not only comprise a classification, naming or grouping of the trained object but also to comprise measuring relevant information in the training and/or in the meta data of the training result, e.g. dimensional information or relative proportions of the object being trained.

It is also an object to provide an according surveying instrument providing a semi-automated or automated surveying based on a machine learned dataset of objects to be surveyed, preferably wherein the dataset comprises additional information for the instrument on how to survey a trained object.

Those objects are achieved by realizing the features of the independent claims. Features which further develop the invention in an alternative or advantageous manner are described in the dependent patent claims.

Some embodiments of the present invention relate to a method for automatic surveying of a real word object by a geodetic surveying or metrology instrument. The instrument can e.g. be a tachymeter, total station, laser scanner, 3D scanner, coordinate measurement machine. The invention comprises an acquiring of a picture by the surveying or metrology instrument, which picture comprises (or in other words depicts) the real world object to be surveyed.

It also comprises an automatic detecting and classifying of the real world object, which object is to be measured or surveyed, in the picture by a computation unit, resulting in a detected real world object. The detected real world object can therein e.g. be classified to be certain object, to be within one or more certain object-classes and/or to comply or comprise other object-specific properties and/or object associated meta information. For example such automatic detecting and classifying can be done by a computation unit or processor which is comprising a detector and/or classifier, to which a digital real world picture from a camera is provided. An automated measuring or surveying of the detected and classified real world object can then be done by the metrology or surveying instrument, for determining a location (like a position and/or orientation information of the object in real world) and/or a geometrical property of the real world object (like a size, shape, form, height, direction, proportion, alignment, etc. information of the real world object itself or with respect to another real world object). According to the invention, the automatic detecting and classifying is done with a classifier based on a model acquired by machine learning, which machine learning is based on machine learning training data comprising a virtual digital 3d-model, which is representing the real world object and which comprises meta information of this 3d-model. The classifier can therein in particular comprise a classification model trained or generated by machine learning, e.g. embodied as a computation unit or computer, preferably comprising a neural network.

The automated measuring can in one embodiment in particular be and automatic measurement by the instrument, or in another embodiment a semi-automatic or user guided measurement in which the instruments guides an operator to perform a measurement task according to the detection and/or classification or accomplishes at least part of the measurement task autonomously based on the detection and/or classification. The meta information can therein comprise at least an object-class-identifier, object-type-identifier, object-name-identifier and/or object—measurement-identifier for the real world object.

The machine learning training data can therein comprise a plurality of numerically rendered images, which are derived from the 3d-model, in particular comprising a ray-tracing algorithm in the rendering. The rendering of the numerically rendered images from the 3d-model can be established with virtually simulating environmental conditions of the 3d-model, in particular varying environmental conditions.

In particular, those environmental conditions can comprise at least one of a viewing angle, illumination, shading, foreground, background, fog, flare, scale, or other computer renderable environmental conditions which are simulating a view of a real world environment.

In one embodiment, the resulting real world picture can be a two dimensional picture and/or the numerically rendered images can be two dimensional images. In another embodiment, the real world picture can comprise 3D information and/or the numerically rendered images can comprise 3D information. For example, such 3D information can comprise a depth image. Such depth images can be derived as real world pictures by a surveying or metrology instrument, e.g. by using a RIM-camera, a laser scanner, a structured light scanner, a stereo imaging unit, a SLAM evaluation, etc. For the training, such depth images can also be rendered from a virtual digital 3D-model by known approaches, similar to the rendering of 2D images already described. In particular, the present invention can be worked with a combination of 2D and 3D pictures and images, for a completion of information for the automatic detecting and/or classifying. Another option for such 3D information would be the use of point cloud data, either directly or to derive a depth image thereof.

Besides real world pictures and/or rendered images in the range of visible optical light, the present invention can also be worked on invisible radiation bands, in particular in the infrared (IR) and/or ultraviolet (UV) range, but optionally also in any other frequency range. The virtual digital 3D-model can therefore also comprise a physical model representing such non-visual properties. For example such a physical model can be used to render temperature information, e.g. in form of a finite element approach or the like.

Such additional information can e.g. be represented in the picture and/or image in form of an additional "channel", which is also considered in the detecting and classifying—like an additional depth, temperature, IR, UV, etc. channel besides the Red/Green/Blue (RGB) channels of a visible image or picture.

The 3d-model and the resulting learning data can comprise the meta information, which is comprising at least one measuring-feature, wherein the surveying or metrology instrument can automatically measure at least one of the at least one measuring-features provided thereby. This at least one measuring-feature can e.g. comprise at least one of an axis, symmetry, dimension, distance, angle, diameter, depth, relative proportions, geometric dependency, scalability, etc.

The rendered images can also be depicting a generic geometrical feature from the 3d-model, which is representing a generic geometrical feature being potentially present at a plurality of real world objects, and it can comprise meta information on how surveying of this generic geometrical feature can be established. For example, therein an untrained real world object can be automatically measurable or surveyable based on the automatic detecting and classifying of one or more of those generic geometrical features.

Accordingly—or to say as equivalent complement —, the present invention also relates to a method of machine learning a surveying or a metrology instrument, for the surveying instrument to establish an automatic detecting of a real world object in camera pictures taken by the instrument. The camera can therein e.g. be a 2D camera, a 3D camera, each with a visible and/or invisible spectral range, and or a combination of such. The camera picture can accordingly be at least one of a visual picture, an IR- or UV-picture, a depth-image picture, etc. In particular this can comprise an automatic surveying of the real world object by the surveying instrument, based on the detecting. The method of machine learning can therein be characterized by deriving of training data, which can comprise a numerical rendering of digital images from a 3d-model, which 3d-model is representing the real world object and which comprises meta information of the real world object it represents. In an embodiment, the machine learning can be an automatic supervised machine learning, respectively an according automatic training of a detector and/or classifier of a surveying or metrology instrument. In the machine learning, a training of a feature-vector based classifier and/or a neural network can be comprised, which is based on said training data that comprises the numerical rendered images showing the object.

Some embodiments of the present invention therefore relate to a geodetic instrument or metrology unit, e.g. as described above, configured to implement at least the measurement instrument relevant parts of the invention, in particular by utilizing previously machine learned datasets and primarily utilizing the detecting and identification of objects and especially the measurements.

The invention can accordingly also relate to a surveying instrument, in particular a geodetic surveying instrument, e.g. a tachymeter, total station, laser scanner or 3D scanner, built and configured for carrying out the method described herein. The surveying instrument therein in particular comprises a camera for taking real world pictures and also comprises a classifier with a machine learned neural network, which is trained on numerically rendered images which were derived from a virtual 3d-model.

The invention can accordingly also relate to a metrology instrument, in particular a portal coordinate measurement machine or an articulated arm, built and configured for carrying out the method described herein. The metrology instrument therein in particular comprises a camera for taking real world pictures and also comprises a classifier with a machine learned neural network, which is trained on numerically rendered images which were derived from a virtual 3d-model.

Such a surveying and/or metrology instrument can in particular provide an autonomous or a semi-autonomous measurement mode, which automatically measures geometrical features of a real world object, which is automatically identified by the classifier in the real world pictures, wherein latter is done according to trained meta information derived from the virtual 3d-model.

In other words, some embodiments of the invention relate to a method of object detection and/or classification based on machine learning, wherein the machine learning algorithm is trained on a virtual 3d-model representing the object, which training can be done in automated procedure. After such a learned object is detected and/or classified in a real world picture captured by a camera at the measurement system during the measurement in the field, an at least partially automated or machine guided measuring procedure can be applied on the detected object according to the classified object type and/or its alignment with respect to the measuring system and other information derived during the training phase.

According to one first example of an embodiment of the invention, a fully automatic measurement of objects in real world by a measurement device can be provided, according to the machine learned automatic detection and/or classification of the objects, in particular completely or substantially without human operator interaction.

According to another second example of an embodiment of the invention, the measurement device can provide or suggest an operator of the device with instructions on where and/or how to measure an object to. For example by suggesting an object and/or object-point(s) at the object, which could be measured—as it is derived according to the machine learned automatic detection of an object and/or according to an objects classification. Optionally, such can also comprise meta-information which is stored and/or learned together with the classification, which meta information can in particular comprise measurement information for this object which can be evaluated to generate a measurement suggestion for an automatically detected and identified object. The operator can then confirm, approve, correct, modify, supplement, dismiss, etc. such an automatic suggestion from the device. In a specific embodiment, an operator can also train the device to detect and or classify previously unknown objects. He can also direct the device to objects which were overlooked by the automatic detection and/or classification and teach the measurement device to detect, classify or measure said object, for example by choosing an object on a screen, classifying it from a list of object classes (or generating a new classification). He can then also measure the object manually and optionally thereby re-train the device for detecting and/or classifying this object and preferably also how and/or where this object is to be measured. Such can in particular be done interactively between the device and the operator by an according computation unit user interface provided for the device.

In a third example of an embodiment, there can be a combination of the first and second example from above. Such can comprise functionalities in-between a fully automated measurement by the machine learned device by itself and a sole operator guidance of the device.

Thereby, in one embodiment, the invention comprises the underlying aspect of automating a measuring process in surveying or metrology by automatically detect and/or recognize an object of interest based on camera picture data captured with the measuring device. An example of a workflow can comprise at least the following steps:

Acquisition of picture data with a measuring system, e.g. by a total station, terrestrial laser scanner, coordinate measurement machine, etc.

Detection/recognition of an object of interest, which is to be measured, based on the picture data and a trained object detector/classifier unit.

Application of a measuring procedure on the detected object with the measuring system according to the object type and/or the object alignment (position, orientation) with respect to the measuring system.

Therein, the object detection and recognition is based on a machine learning algorithm. However, instead of merely capturing thousands of real world pictures that represent the object in a multitude of variations (e.g. different perspective, varying lighting conditions, etc.) with a real camera for training purposes—in the present invention, the object detector/classifier unit is trained based on a 3d-model of the object. The object detector or classifier, which can e.g. comprise a convolutional neural network, can therein be trained virtually based on the 3d-model and not solely on real world pictures of the object. Therein, e.g. a set of artificial images (RGB images, intensity images, depth images, etc.) can be generated from the 3d-model of the object by rendering, which rendered images are then used as training data.

In training the classifier also aging effects or structural deformation might be considered to also include this kind of variations that might appear on a real world object.

The method, or at least those parts of it which involve computation and/or calculation, can also be embodied as one or more computer program products, which are stored on a machine readable medium or embodied as electromagnetic wave (such as e.g. a wired or wireless data signal). Consequently, the invention further relates to such a computer program product respectively the machine readable medium, comprising program code for executing a method as described herein. In particular the computer program product can comprise code of a machine-learnable classifier trained on by numerically rendered images derived from a 3d-model of a real world object to be identified. Alternatively or attainably, the computer program product can also comprise code embodying a machine-learning of a classifier by generating numerically rendered images derived from a 3d-model of a real world object, which rendered images are provided as training data for the machine learning.

The computer program can be executed in a surveying or metrology instrument according to the invention, which instrument therefore also involves at least one computation chip built to run a computer program providing the functionality according to the invention, with or without the computer program actually loaded.

BRIEF DESCRIPTION OF THE DRAWINGS

Units, methods and systems according to the invention are described or explained in more detail below, purely by way of example, with reference to working examples shown schematically in the drawing. Specifically, FIG. 1a shows an illustration of an example of an embodiment of a 3D-model of an object in view of the invention;

FIG. 1b shows some examples of embodiments of images rendered on basis of the 3D-model above;

DETAILED DESCRIPTION

Figure 2A:
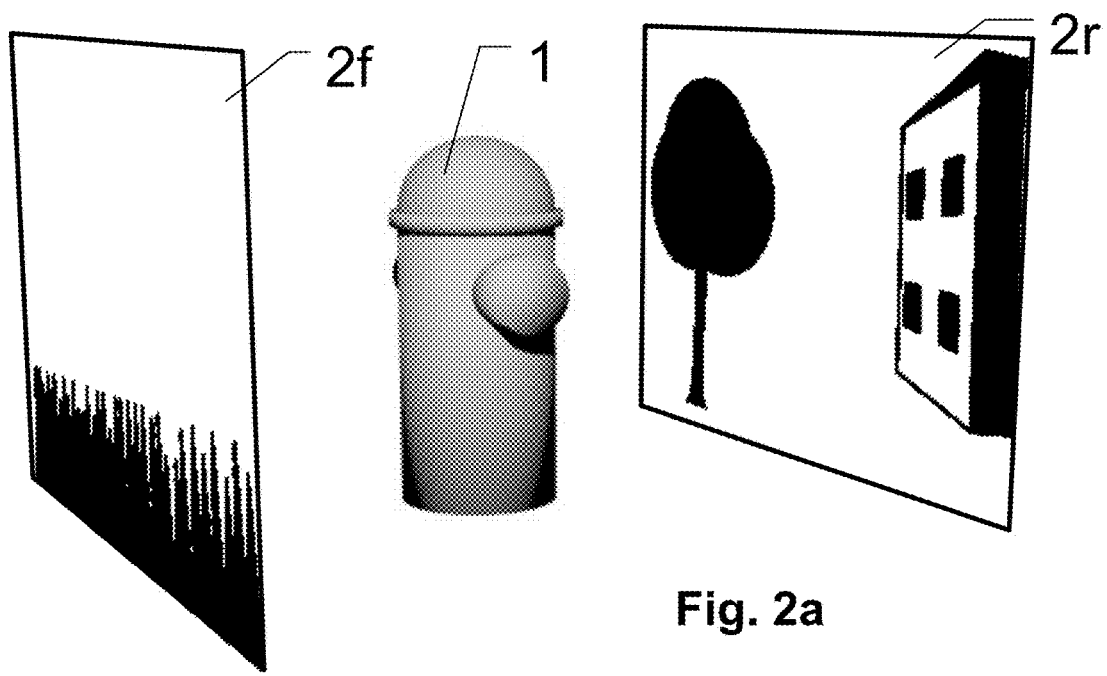
FIG. 2a shows an illustration of an example generating an advanced composition of numerically rendered images according to the invention.

The diagrams of the figures should not be considered as being drawn to scale. Where appropriate, the same reference signs are used for the same features or for features with similar functionalities. Different indices to reference signs are used to differentiate between different embodiments of the same or an equivalent feature that is shown exemplary. The term "substantially" is herein used to describe the fact that a certain value, arrangement or feature does not necessarily need to be 100% exact, but can maybe slightly aberrate, while still being within scope. In other words, there can be some slight deviations, e.g. due to inaccuracies, unintentional, design considerations, tolerances, etc. —but there is a clear tendency towards the mentioned value or arrangement, in particular in view of the technical effect to be achieved therewith. Especially, it is not meant to be an obvious opposite. In any case, besides the meaning of "almost exactly" the term "substantially" can always be interpreted to comprise or also express the meaning of "exactly", or of the particular feature itself.

In the following, the invention will be explained by way of example, wherein the object to be surveyed is exemplary shown embodied as a hydrant or fireplug, respectively as a machine-part or as a piping, which are representative for any other real world objects to be measured or surveyed, for example like lamp post, lanterns, poles, fences, junction boxes, buildings, signs, bridges, landmarks, doors, windows, manhole covers, trees, pillars, etc. In meteorology, such objects might be for example, holes, bolts, nuts, silhouettes of manufactured goods, cars or parts thereof, machines or parts thereof, milled parts, casted or molded parts, etc.

FIG. 1a to FIG. 3b are exemplary, but non-limiting, showing a hydrant as object of interest. In FIG. 1a a 3d-model 1 of such a hydrant is shown in a setup with a camera 6 representing a point of view and a light source 5. Based on such an example of a virtual setup in a computation unit, a set of multiple images 2 (e.g. the images 2a . . . 2n of FIG. 1b) can be numerically rendered, preferably with changing the position and/or orientation of the camera 6 and/or of the light source 5 for the images 2 of the set. The setup is therein a virtual setup, e.g. stored in a memory of a computer or another computation device, in which a CPU (Central Processing Unit) and/or GPU (Graphical Processing Unit) utilizes a digital 3D-model 1 of the hydrant-object to numerically rendered digital images 2 thereof, in particular from a certain point of view 6 and with a certain illumination 5. The view 6 can therein simulate the view of a real world camera, in particular simulating its lenses, aperture, focus, zoom, etc. Therein, the certain point of view 6 and/or the certain illumination 5 can be varied for each of the images 2. Besides a variation of the view 6 and lightning 5, there can also be other conditions, like e.g. different colours (where appropriate for the specific object), aging, fog, flare, reflections, etc. to be virtually applied in the image rendering process.

This rendering results in a training dataset of a plurality of images 2—e.g. as some of them are exemplary shown in FIG. 1b by the images 2a to 2n—in which the hydrant of the 3D-model 1 is represented as seen from different views 6 under varying lighting conditions 5. Those rendered images 2a, 2b, 2c . . . 2n are in a first embodiment flat two dimensional digital images 2, in particular with a virtual viewing perspective similar to a picture as taken by a real world camera. In addition to a varied point of view 6 and/or illumination 5 in different rendered images 2a, 2b, 2c . . . 2n of the 3D-model 1 of the object, also the 3d-model 1 itself can be varied as well. For instance, several colors can be assigned to the object, virtual aging can be applied or the objects shape itself can be manipulated, e.g. by stretching the 3d-model 1 in the z-direction, in case the object is available in different heights.

Besides the pure image data, those rendered 2D images 2 according to the invention can comprise additional meta-information regarding the object they are showing and/or regarding the conditions in which the image 2 has been rendered. The meta data can also comprise additional object-specific meta information, in particular meta information, which is relevant for surveying or measurement purposes. Examples on such surveying relevant information and how to derive and define such, can inter alia be found in documents like EP 2 569 596. Such additional information is provided together with the rendered image 2, e.g. linked to the rendered image 2 or to the object which is rendered in the rendered image 2. The additional information is then used as additional training data for the machine learning. For example, this additional information can comprise geometrical information, like objects symmetries or axes 8v,8h, coordinate system information 9x,9y,9z, customary orientations like a direction which is usually substantially upright (such as 9z) or vertical, defined relative proportions of portions of the object with respect to each other, scalable directions of the object like variable vertical heights, mounting tolerances, diameters 9d, cross-sectional information not directly visible in this view, preferred measurement points 9m which can be surveyed in an image-view, in particular wherein such a preferred measurement points 9m can be linked to certain geometric information of the object and can comprise information on how this geometric information can be derived by one or more specific measurements, etc.

In particular, such additional information of the object can comprise additional meta information, such as geometric information, which is relevant for surveying purposes, preferably in such a way that a surveying can be automated. For example, by the additional information comprising knowledge of the fact that the shown hydrant is circular in its diameter (or from another point of view elliptical, etc.)—thereby it can automatically be postulated that by measuring towards the center of the diameter, and addition of half of the diameter in substantially horizontal direction to the resulted measurement value, a location of the central axis 8v of the hydrant can be surveyed. Such automatic postulation can therein be implemented in the teaching of the machine learning, in the evaluation by measuring instrument and/or at least partially in both of those. In particular e.g. combined with an additionally trained knowledge that a hydrants central axis 8v is usually substantially upright or plumb, this enables that a real world hydrant 41 can then be surveyed—which can then preferably be done automatically, e.g. in a semi- or fully-automatically mode.

Figure 2B:
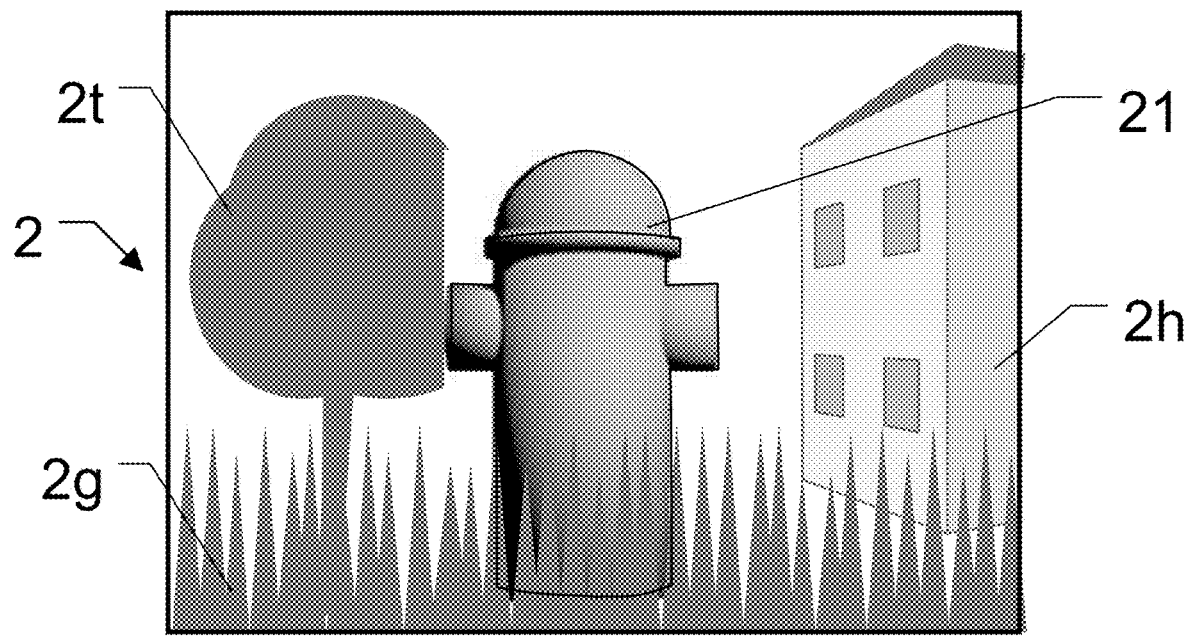
FIG. 2b shows an example of one of multiple numerically rendered images of the object as shown above, which is used for training according to the invention.

As e.g. illustrated by FIG. 2a and FIG. 2b, a view of the 3d-model 1 can also be combined with a foreground 2f and a background 2r, e.g. provided in form of images, pictures or additional 3D-models. For instance, in the shown case of a hydrant-model 1 in FIG. 2a, a foreground image 2f can represent grass or bushes or the like, which are often present in front of real world hydrants 41 when those are pictured by a camera. Another example is shown by the trees and building in the background, which are her provided in form of a background image 2r, but which could alternatively also be provided at least partially in form of 3D-models of such background objects—such as sky, mountains, meadows, houses, buildings, skylines, trees, parking lots, cars, or other common things which are found in the background of photos of the trained object in its natural environment.

Such a combination results in embedding the model 1 of the object in a realistic scene, which can then be provided as rendered training images 2, such as the example shown in FIG. 2b. Those computer generated images 2, which will be used for training the machine learning, will comprise an rendered image of the hydrant-object 21 to actually be trained, but in a more realistic (but in general still virtual) environment—depicting an environment which is likely to be found in pictures of real word sceneries. The therein used background 2b and/or foreground 2f can therein comprise real world pictures or computer rendered images or a combination thereof. For example, there can be a database comprising such backgrounds 2b and/or foregrounds 2f which is accessed for the rendering of the training images 2. Such a database can therein also comprise additional meta information, e.g. regarding which foreground and/or background to be applied. Latter database can in particular also be grouped dependent on an expected site, like urban, suburban, rural, etc. and/or dependent on the expected geographical location like a specific region, country, etc. For example, it well known that not only different kinds of hydrants are common in different countries, but also that houses 2h, flora 2t, floor coverage 2g, skyline, etc. tends to be specific to a certain region.

Figure 3A:
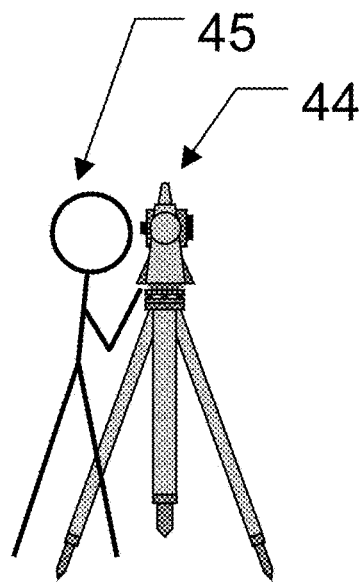
FIG. 3a shows an example of a surveying of a real world scene with a geodetic surveying instrument according to the invention.
Figure 3A:
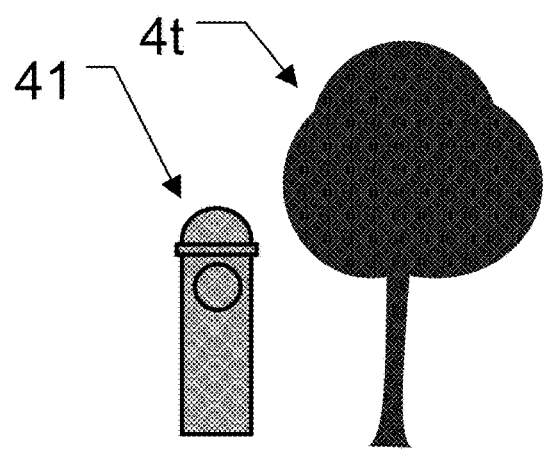

In FIG. 3 a first embodiment for illustrating an example according to the invention is shown, in which an automatic target alignment of a surveying instrument 44 is illustrated. Optionally, this can also involve an automatic measuring of the target object 41. A corresponding workflow can e.g. be as follows:

The shown instrument 44 can e.g. be a total station like geodetic surveying device. After the instrument 44 is set up, in a first step, the surveying instrument 44 captures a real world picture 3 (e.g. shown below) of its environment, i.e. one or more digital pictures or a digital panorama picture of the environment.

A computation unit, e.g. comprising digital processor, memory and input/output interfaces, analyzes this digital picture 3 in such a way to identify and or locate previously trained objects within the picture 3. According to the invention, the previously trained objects are at least partially trained on numerically rendered images 2, which are derived from 3D-model data 1 of the objects, e.g. such a CAD-data, pointcloud-models, or other 3D-computer drawings in various data formats. Numerical rendering engines to generate image data 2 from such 3D-models 1 are known in the art of computer graphics and can be used to provide the numerically rendered images according to the invention, in particular so called photo-realistic rendering engines, preferably comprising ray-tracing, can be utilized for this aspect of the invention.

On training of an object the training data also comprises other information of the objects beside the pure geometrical data. In particular it can comprise one or more name-, type-, class-, or other information, e.g. provided as meta data, which can be preserved in the training and being linked in the training result, in order to identify the trained object based thereupon. According to the invention, such meta data can in particular beside a classification also comprise measurement relevant meta data, such as e.g. geometrical information of the object, preferred measurement target areas at the object, georeferenced features of the object, object features to be geometrically referenced for measurement purposes, such as axes, directions, heights, lines, rectilinear structures, . . . .

In an embodiment with an interactive-measurement mode, an automatic surveying with user interaction can be provided, e.g. in which the surveying instrument 44 automatically suggest a measurement based on a picture 3 taken with a camera at the surveying instrument 44, in which picture 3 previously machine learned measurement targets are automatically identified, based in the rendered training images 2. Those identified potential measurement targets are then presented to the operator, e.g. by presenting the picture or part of it, preferably with the identified potential measurement targets visually marked and optionally also indicating an automatically identified classification, measurement strategy, or other corresponding meta data for the identified measurement targets. Such a specific measurement, which is presented to the operator can then be confirmed and/or adjusted as necessary, whereupon it will be automatically executed and documented by the instrument 44. Thereby, just by letting the surveying instrument 44 take a real world picture of a scene viewed by the instrument 44, an at least partially autonomous measurement workflow can be executed.

In another example of an embodiment, the surveying instrument 44 can fully automatically detect and identify the hydrant in a scene in view of the instrument 44, which view is captured by the instrument in form of a camera picture 3. This detecting and identifying is done based on the machine learning training data which had been generated on basis of a 3D-model 1 of the object to be detected, respectively on basis of artificially rendered images 2 produced thereby. Once the object is identified in the picture 3 to correspond to the trained 3d-model 1, the identifying computing system is also aware of corresponding meta data, e.g. that this specific object or this type or class of the object 1 can potentially be used as a fixed surveying landmark. Another meta information can e.g. be that this specific identified object can be surveyed by measuring towards point 11, which is at the center of a circular knob at the top of the hydrant. It can further comprise measurement relevant meta information, e.g. in for that thereby the hydrant's central axis 8v is defined to be exactly (e.g.) 5 cm farther than the measured value. Such meta information was in particular comprised in the initial 3D-model 1 which had been used for rendering the training data 2, and which meta information was stored during training as corresponding surveying information for this object or for a class of this object. Thereby, the surveying instrument 44 can automatically survey this hydrant 41 without requiring an operator to carry out the identification and localization of the hydrant 41 in the field and/or the requirement to manually aim a thereto related measurement target point at the hydrant 41. The instrument 44 can e.g. just present the result by showing the picture 3 with the hydrant 31 marked, tagged 3i and optionally already supplied with automatically derived measurement results 3m—which can then be approved by a human operator 45, if such is required.

Figure 3B:
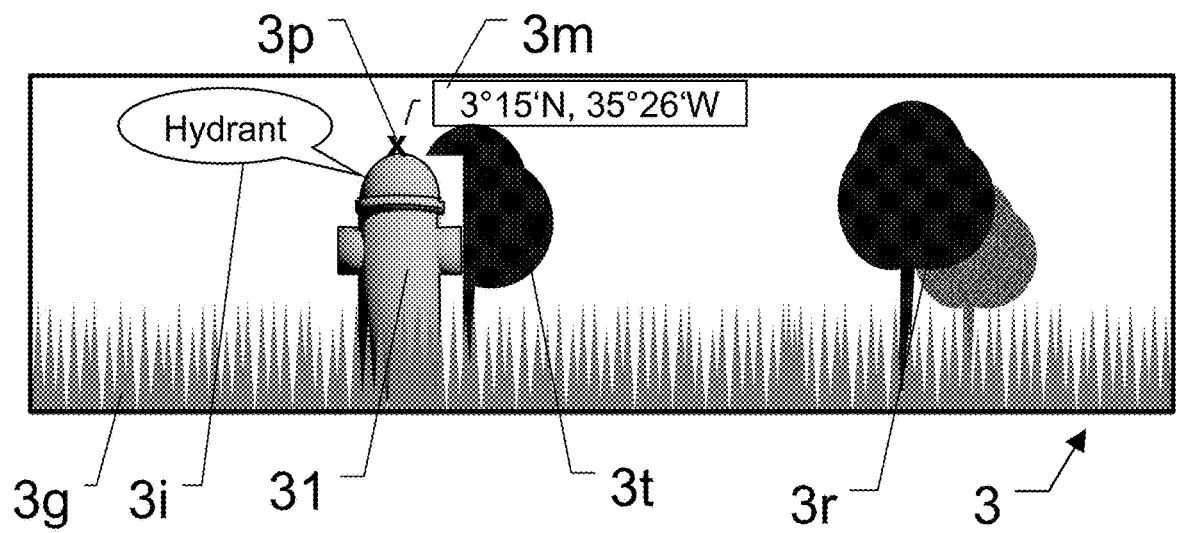
FIG. 3b is showing an example of a real world picture from a camera at the surveying instrument as shown before.

An example of such a real world picture 3 is illustrated in FIG. 3b, (which is due to regulations here also provided in form of a computer painted picture, but nevertheless represents a real world picture taken by a camera). In this real world picture 3 there is grass 3g in the foreground, in which there is a hydrant 31 as well as multiple different trees 3t, 3r. In addition, the real world picture 3 is here augmented with example meta information 3i and 3m—apparently not present in real world.

An object detector/classifier, in particular comprised in the surveying instrument 44, which is trained on a specific object of interest (e.g. on hydrants 1) is applied to the picture data 3, which is preferably provided in a digital picture data format. In case that one or more objects 31 of interest are detected by the object detector/classifier within the picture 3, a measuring procedure can be started, in which procedure the surveying instrument 44 can aim to the detected object 31 of interest and can perform one or more point measurements 3p, for example geodetic measurements as known in the art of land surveying.

Figure 4A:
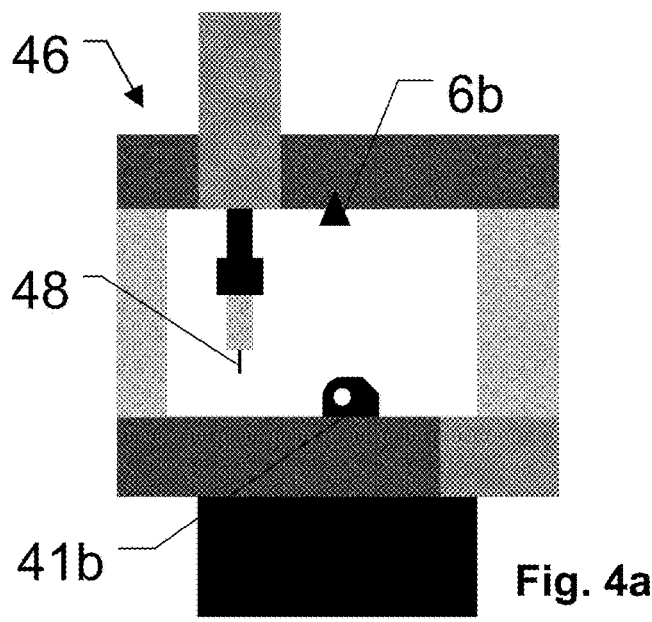
FIG. 4a shows an example illustrating a metrology instrument in form of a CMM utilizing the invention.

FIG. 4a shows a second embodiment of an example according to the invention, showing the inventive principle used in an automatic part recognition on an exemplary embodiment of a coordinate measurement machine (CMM) 46 as metrology instrument.

Figure 4B:
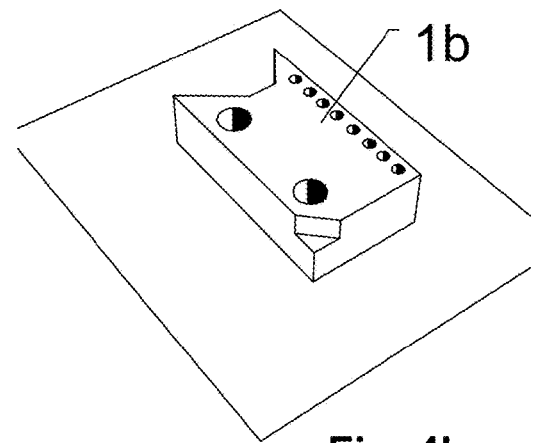
FIG. 4b shows an example illustrating an embodiment of a 3D-model of a part which has to be measured according to the invention.

FIG. 4b shows an example of an embodiment of a 3d-model 1b of a part 41b, also comprising a specific geometric feature 21. Based on a 3d-model 1b of a part 41b or models 21 of specific geometrical features of the part 41b, which 3D-model 1b represents the object or feature which has to be automatically detected, a training dataset for a machine learning algorithm is generated by numerically rendering images of this part 1b or feature 21. This training dataset consists of rendered images 2 that represent the part 41b as seen from different perspectives under various environmental conditions, e.g. lighting, etc.

Figure 4C:
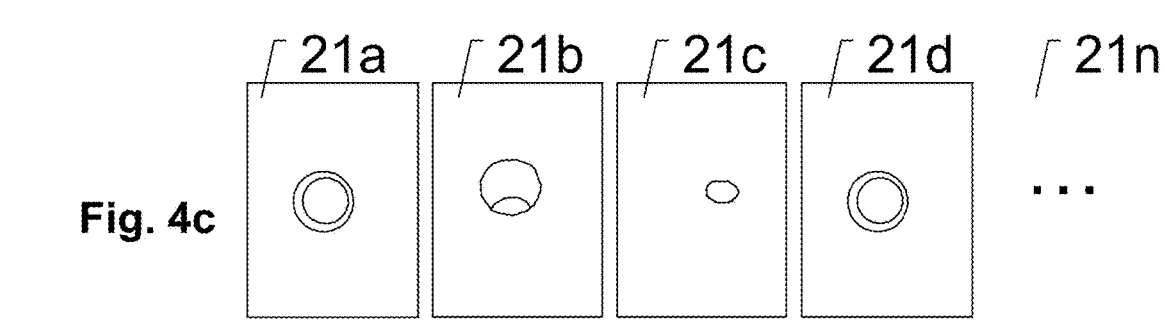
FIG. 4c shows examples illustrating rendered images of an example of a geometric feature to be measured, to be provided as training data for a machine learning routine.

Specifically shown are in FIG. 4c examples of such numerically rendered images 21a, 21b, 21c, 21d of a specific feature of a drilled hole, derived from a 3d-model of such a hole from different points of view and with different illumination, different materials, different colours, etc. which are training data for a neural network in a detector/identifier which will then be applied for evaluation of such drilled holes on real world pictures according to the invention.

In the rendering, optionally also images or 3D-models of e.g. a CMM-Table or of a surrounding of the CMM can be supplemented as background in the rendered images 2. Using these rendered images 2, a classifier is trained, which is then dispatched on a controller of the CMM 46. A classifier in this case can be embodied as a computation unit built, configured and programmed to automatically detect and identify previously trained items in real world two or three dimensional pictures from a camera. The bases to detect and identify an item can e.g. be provided as a dataset generated by such training with image data of the item. Such a classifier can in particular be implemented in hardware and/or software and can e.g. comprise a neural network architecture or a deep learning architecture.

For measuring a part 41b, the user places the instance of the part 41b which has to be measured onto the CMM 46. With a camera 6b at the CMM 46, at least one picture comprising the part 41b is taken, which is then input to the classifier. The classifier automatically recognizes the part 41b and the type of the part 41b in this picture. Based on the thereby resulting information, the CMM 46 can load a corresponding measurement program for this part 41b or type from a database and can start this measurement program automatically.

Besides recognizing a type of the part 41b, according to the invention the part 41b is also not required to be placed at an exactly defined location and/or in an exactly defined orientation or alignment on the CMM 46. The classifier can also automatically recognize the alignment and orientation of the part 41b on the CMM 46 and thereupon provide the CMM 46 with an at least a roughly defined base coordinate system of the part 41b. For example, this base coordinate system can be one, which had been defined in the 3D-model used in training and as it was stored as meta-data in the training set. This meta data can accordingly be recovered when the part 41b is recognized by the classifier—whereby also the base coordinate system is known. Such a trained and then recognized geometrical meta information for measurements according to the invention does in general not replace a CMM measurement, in particular as it lacks sufficiently high geometrical accuracy. But such geometrical information is e.g. still sufficiently accurate to approach desired reference areas of the part 41b in the CMM 46 by the measurement probe 48. By those measurements taken with the CMM-probe 48, a more precise location of the part 41b can then be defined, e.g. in full precision of the measurement system of the CMM 46. An aspect therein is also that, by recognizing the part 41b and its location according to the invention, undesired collisions of the measurement probe 48 or of other portions of the CMM 46 with the part 41b can be avoided.

FIG. 4b illustrates the part 41b as a 3D-model 1b of the part, e.g. as seen on screen of a Computer Aided Design (CAD) system. The shown example is a 3D-model 1b of a part 41b to be milled by a CNC-machine, characterized by its outer shape and the holes 21. According to the invention, this 3D-model 1b can be numerically rendered to a plurality of digital images which are used in a machine learning algorithm training on order to establish and configure a classifier capable of identifying the real world counterpart of this 3D-model 1b in pictures from a camera 6b at the CMM.

In general, in the present invention, the machine learning in the most common embodiments of the present invention can be referred to by the term "supervised learning", as the 3D-model comprises or is linked to the meta-data, e.g. defining a class of the object to be learned for identification or classification and/or a location or bounding box of the object for its detection. In many embodiments, the present invention can make use of a so called "shallow learning" approach, as there are pre-defined features, descriptors, labeling and/or feature vectors defined together with the numerically rendered learning source as meta information—in particular in an automatic way. But apparently, such would not hinder to also, at least partially, consider to implement "deep learning" approaches.

As some of the most common presently known learning principles of all those possible algorithms and their variants which can be used according to the invention, the classification can be based on supervised and semi-supervised and unsupervised learning methods, in particular linear and quadratic classifiers, particularly Linear and Quadratic Discriminant Analysis and Fisher Linear Discriminant, logistic regression; Support Vector Machines with linear and non-linear kernels (Fisher, RBF, polynomial, hyperbolic, matrix defined), in particular Least Squares Support Vector Machines, variants of all above, particularly Multiclass, Structured and Bayesian SVMs; Bayesian classifiers in particular Naive Bayes classifier; probabilistic graphical models, in particular Conditional Random Fields; deep learning, in particular neural networks, particularly convolutional neural networks; recurrent neural networks, particularly LSTM networks, restricted Bolzmann machines decision trees; ensembles of classifiers, in particular tree ensembles, Random Forests and Gradient Boosted Trees, boosting, bagging and voting classifiers, ensembles of neural networks; neighbour-based techniques, particularly k-NN; learning vector quantisation. The European patent application EP 16206779 (herewith incorporated by reference) comprises some examples and backgrounds on possible embodiments of machine learning approaches.

In another specific embodiment according to the invention or in a combination with the previously described approach, there is a direct training of the detector and/or the classifier based on the digital 3D-model itself—without explicitly rendering images and providing those rendered images as training resource. For example the 3D-model itself (e.g. in form of CAD-DATA, point cloud data, mesh data, etc.) is feed as training input. As an example, a vector representation of an image can be approximated directly from the 3d model or its processed representation like for instance a voxel grid, etc. Another option is a technique using a feature predictor that, with defined perspective and lighting description, utilizes local geometry and material information to predict subsets of features. What is more, a similar approach can also be used to augment an already present representation of an image content, e.g. to properly model noise of the process, simulate an observing object in deferent contexts, etc.

For such an approach, in particular a deep-learning approach can be used, e.g. comprising a neural network. For example, in training a neural network the first hidden layers can be directly activated from the 3d-model and create a response that would be expected from a real world picture of this object. In classification, those first layers will then be replaced by one or more layers that are based on the real world picture. Thereby the present invention can optionally also be embodied without an explicit rendering of virtual images of the object.

For example, an automatic object detector automatically identifies a presence of an object or feature within a picture, preferably also comprising information on its (at least rough) location in the picture, e.g. by providing a bounding-box or the like of the object or feature in the picture. Then the automatic classifier evaluates this detected object or feature from the object detector and automatically classifies it to be an object or a feature of one or more possible classes, preferably comprising likelihood information. Such classes can therein comprise or be derived from said meta information, which was preferably presented during the learning phase.

In other words an embodiment of the invention can be described by establishing a synthetic, pre-trained classifier and/or detector, by deriving a plurality of numerical renderings from a 3D-model and feeding those renderings as training resource for a supervised learning of the classifier and/or detector. The renderings can therein comprise at least one object of interest to be trained, preferably embedded in a virtually generated realistic environment, in particular from a plurality of different views and/or different lightning conditions and/or environmental conditions. Thereby a generic classifier and/or detector can be trained on virtual information.

In an optional further stage of the invention, such a generic classifier and/or detector can additionally be post-trained by real world pictures. Such can not only be done in an initial training phase, but also or alternatively in the field use of the classifier and/or detector. For example, the real world pictures on which the detector and/or classifier is applied can—if an object is detected/classified therein—be used as additional training resource to enhance the detector and/or classifier, e.g. to improve its real world success rate. Such information can in particular be advantageous, by a (in practical embodiment often available) feedback of a user or operator, which feedback confirms or corrects the result of the automatic detector and/or classifier in this real world picture. Such a real world picture also comprises typical on-site environmental conditions (which for instance in case of a stationary CMM does in general not change much), wherefore such real world picture data can be highly valuable for refining the generic training—which had been primarily based on numerically rendered information—towards a specific detector and/or classifier for the actual environment or task—whereby the reliability of the automatic detection and/or classification can be improved.

According to another embodiment shown in FIG. 4c, not an entire 3D-model of the whole part 1b—which actually has to be measured by the CMM 46—is machine learned based on a set of rendered images thereof. According to this embodiment of the invention, certain features or portions 21 of such a part 1b can be rendered to images which are provided for learning. Thereby not a whole part, but geometric features are machine learned, in particular generic features. For example geometrical features, which are building up basic shapes of various parts to be measured and/or of generic target features to be measured at those parts, can be trained and learned individually. For example, such features can be different kinds of holes 21, nuts, bolts, phases, rounding, corners, parallels, recesses, . . . .

Specifically, the shown example illustrates a series of rendered images 21a,21b,21c,21d, . . . , 21n of a hole in a flat surface, seen from different points of view and/or with different illumination. Once trained, based on numerically rendered images from a 3D-model of such a hole, a classifier unit can identify similar holes in camera pictures of a part to be measured, in particular whereby it is not required to know the part itself.

Figure 4D:
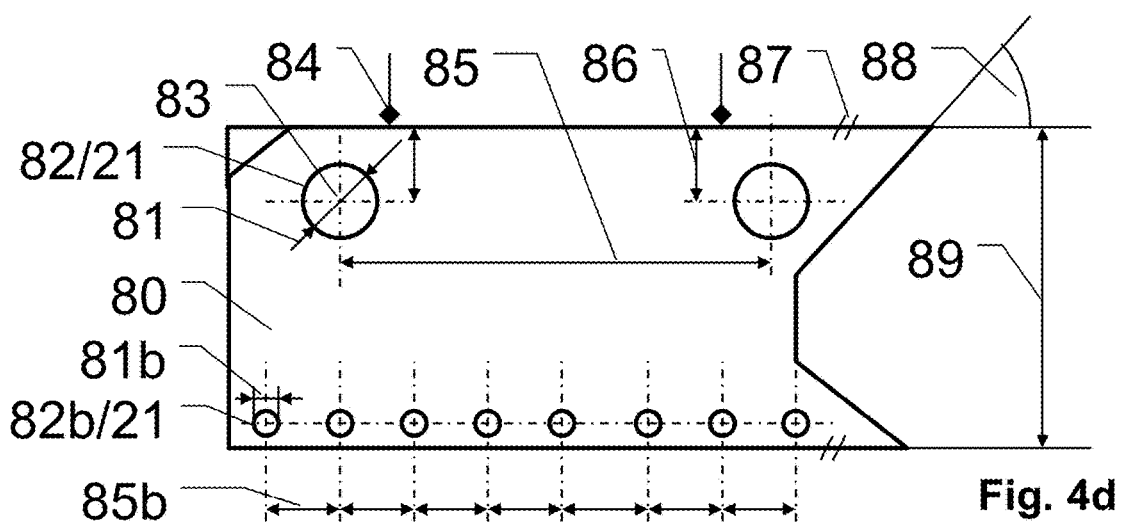
FIG. 4d shows an example illustrating a part measured according to the invention by a CMM.

The in FIG. 4d exemplary shown, automatically CMM-measurement generated top-view of a unknown part 80 which was provided to a CMM equipped according to the invention, comprises many geometrical features. According to an above described aspect of the invention, those features can be identified in a picture of the part 80 which is taken at the CMM 46. For example there are holes 82 and 82b which are identified in the picture as those the look of hole-features had been previously learned based on rendered images 21a,21b,21c, . . . derived from 3D-CAD-data. The learning also comprised information that the identified thing is classified as a "hole". In addition it can also be learned that such a hole 82,82b has geometrical parameters like at least on of a diameter 81,81b, center point 83, location of the center 85,86,85,85b, symmetry axes, depth, etc. According the invention, this identification in the real world pictures does not fully substitute an accurate measurement of those features and their parameters, but it is used for an automated measurement of the feature and its parameters. According to the invention, the features are automatically detected and identified to be a certain feature of a specific type or class. As such a detection and identification can involve a determination of an at least rough location of the detected feature with respect to the CMM 46. Latter is in general sufficient to automatically start a measurement routine at the CMM 46, which actually measures this feature and/or its parameters, in particular more precisely than the detection and identification in the picture can achieve such in the rough location determination. A similar approach according to the invention can be applied to the other features shown, e.g. the outer geometries 89, the angle 88, the parallelism 87, etc. If the whole part itself is identified by the classifier to be a previously reached part, its meta data can e.g. also comprise information on specific points to be measured at this specific part, e.g. the here shown dimensionally critical point 84, and/or a geometrical reference base of this part defined by such points.

In other words, according to the invention, the machine learning can be taught by rendered images 2 of 3D-models 1 of geometric features like edges, corners, or holes—which can be interpreted as metrological counterparts to the geodetic surveying landmarks discussed before. At the CMM 46, a computation unit with a classifier which has been trained in such a way according to the invention, can then detect and identify such features, e.g. a hole 82 drilled into a machine part 80 which is provided on the CMM table, according to a real word camera picture. The CMMs measurement probe 48 can then automatically approach such a feature 82, in particular according to an at least approximate location derived by the identification. Then this hole 82, can be automatically measured, e.g. by automatically loading and executing an according hole-measurement routine by the CMM 46, based in the meta information which had been trained with the identified feature 82. Such meta information can e.g. be the information that the identified feature represents a hole 82, but besides such a simple classification, it can also comprise a more advanced hierarchical classification of the feature 82. The classification-information can then be used by the measurement controller to load a measurement program for this feature 82. Alternatively or additionally, also a link to a corresponding measurement program for this feature 82 or to a corresponding class of measurement programs can be comprised in the training data generated from the 3D-CAD-model 1 which was rendered. Besides, the training data can also comprise specific meta information of the feature 82 in question, e.g. geometrical properties of the feature, which can be measured. For example in case of a hole 82, such geometrical properties can comprise a center point 83, an axis, a diameter 81, etc. Such geometrical properties can be derived as possible measurement data for the hole-feature directly and automatically from the 3D-model when the training images are rendered and can then be comprised in the training data as corresponding meta information. Therein, also more complex measurement data—and optionally also how to derive them—such as e.g. roundness, cross-sectional area, . . . can be comprised and provided as meta information for the feature during its training. Similar can be applied to other common geometrical features of parts to be surveyed by a CMM 46, like e.g. step-, edge-, corner-, plain-, rounding-, sphere-features, etc.

Thereby, for example not only a whole part 41b known in advance according to the whole parts 3D-model 1b which had been used in rendering training images 2 according to the invention can be automatically detected and measured. According to above describes aspect of the invention it is also possible to automatically measure an unknown or at least partially unknown part 80, which can be done according to the present invention by a machine learned algorithm trained on numerically rendered images 21a,21b, . . . of generic measurable features of parts, which images are derived from 3D-models 1 comprising said features. Preferably, therein not only the features are trained to be identified, but the training data also comprises meta information of the feature for classifying it. The meta information can also comprise measurement relevant meta information, e.g. on how to measure this feature and/or which geometrical parameters this feature has and how those can be measured. During training, such can in particular be done dependent on the pose in which the feature is present in the rendered image 2. Information regarding the measurement program to be used, the measurement probe which should be used, how to approach the feature without collision, etc. can either be derived from the classification of the feature by the CMM 46 and/or can be at least partially comprised as meta information trained.

Figure 5A:
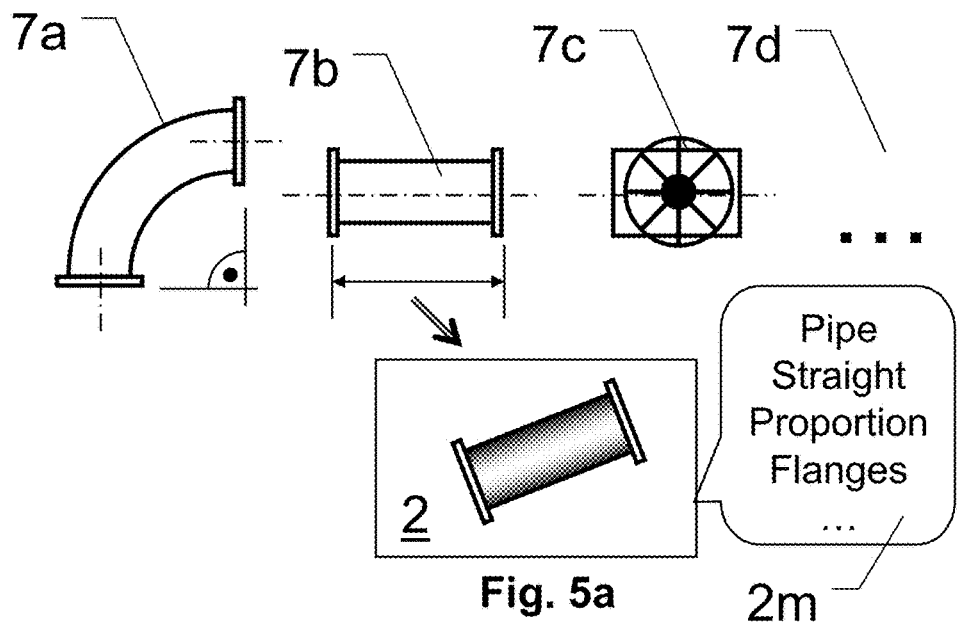
FIG. 5a shows another example illustrating 3D-models of objects to be identified and/or measured according to the invention and to be provided as machine learning training resource.
Figure 5B:
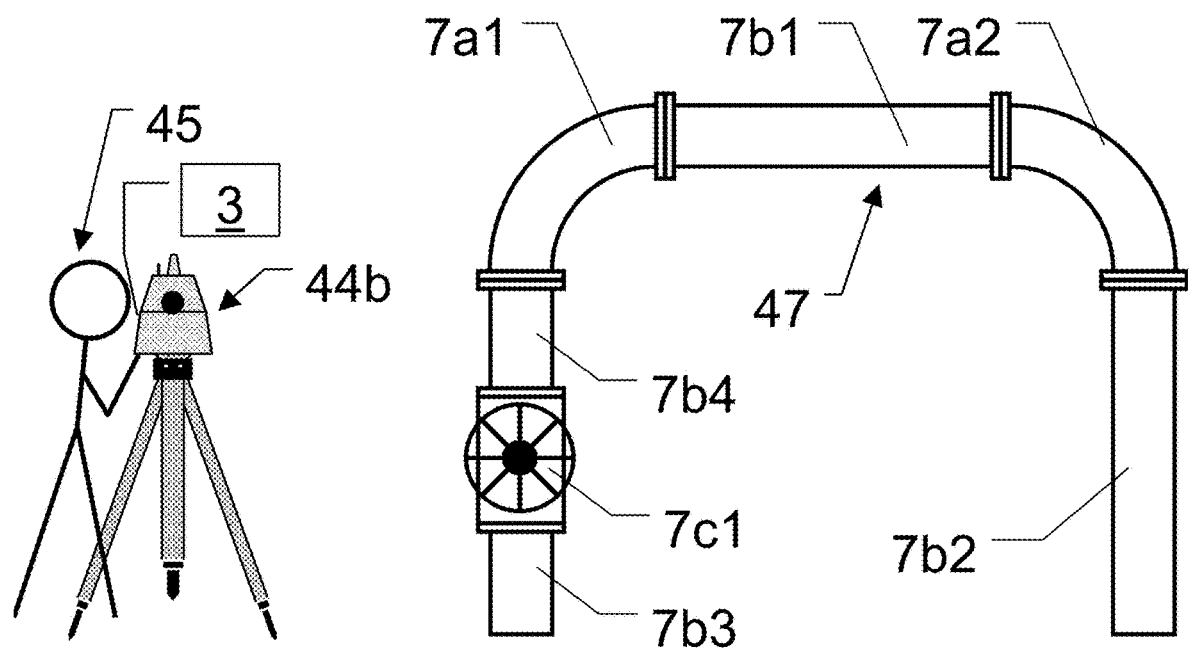
FIG. 5b shows an example illustrating a real world measurement of real world objects according to the invention by a surveying instrument which is exemplary embodied by a laser scanner.

FIG. 5a and FIG. 5b are showing a third example of an embodiment according to the invention, in which a classifier for detection and/or classification of pipe parts is provided.

FIG. 5a illustrates some example of 3D-models 7a,7b,7c,7d of such pipe-parts which can according to the invention be used for rendering images 2 for the machine learning. Just to give some examples, a pipe bend 7a, a straight pipe 7b and a valve 7c are shown (here in flat parallel projection view of those 3D-models 7a,7b,7c), but accordingly there can be many more pipe relevant parts as indicated by 7d, e.g. or according to all the catalog options which are sold. Those 3D-models 7a,7b,7c, can therein also be varied, e.g. in size, colour, length, diameter, in particular as their real world counterparts tend to vary in the field. Those variations can at least partly also be comprised as meta information 2m for the learning, they can be hierarchically grouped, classified by name, type, kind, part number, manufacturer, or many other meta information 2m. In particular, measurement relevant meta information 2m of the pipe parts comprised in the rendered images 2 can automatically be provided by the CAD system as meta-data, like e.g. at least one of variable parameters, dependencies in-between of those parameters, symmetries, axes, dimensional properties of interest, etc. As mentioned above, the 3D-models 7a,7b,7c of the pipe-parts can also be supplemented with a foreground and/or a background for the rendering of the images 2. In addition, the 3D-models 7a,7b,7c can be combined with other elements, such as pipe clips, pipe brackets, screws, bolts, etc. for the rendering of the images 2, in particular in such a way as it is common practice to mount real world piping.

As illustrated by FIG. 5b, such a training result is dispatched exemplary to a laser scanner device 44b. For example, such a laser scanner 44b can be embodied having laser target-axis by which a distance measurement can be established and which target-axis can be deflected e.g. by a rotating mirror or prism. The laser scanner acquires a real world picture, i.e. a 2D-digital-picture by an integrated CCD- or CMOS-camera and/or a 3D-depth picture which can e.g. be generated by an initial low-resolution 3D-scan. In this picture, pipe parts 7a1,7a2,7b1,7b2,7b3, 7b4,7c1 of the piping 47 are detected and/or classified according to data which was trained as described above. Thereupon, a specific measuring program for each pipe part parts 7a1,7a2,7b1, 7b2,7b3,7b4,7c1 can be performed, e.g. based on a high-resolution scan of the pipe parts 7a1,7a2, 7b1,7b2,7b3,7b4, 7c1.

The shown piping example 47 to be measured or checked according to the invention, comprises a real world pipe-parts 7a1,7a2,7b1,7b2,7b3,7b4,7c1, which are counterparts of their corresponding 3D-models 7a,7b,7c, . . . shown in FIG. 5a above. Specifically, the classifier in this example will identify four straight pipes 7b1,7b2,7b3,7b4 of different length, two instances of bows 7a1,7a2 and one pipe valve 7c1—based on training images derived from the corresponding 3d-CAD-model renderings and their meta information which can at least partially also be derived from the 3d-CAD-models.

The classifier can be fully comprised in the instrument, but can alternatively also be trained externally from the instrument and then training results or the whole classifier can be dispatched on a surveying system, e.g. on the terrestrial laser scanner 44b itself or to an evaluation equipment linked to it. Although post processing of already captures data would be a principle option, some of the advantages of the present invention mainly apply when the invention is used in the field during the measurement—for example an at least partially or fully automated measurement of objects or features which the instrument is facing. Preferably such can be done with zero, low or just supervisory interaction from the operator 45 of the instrument 44b.

As mentioned, the real world picture data 3 can be an RGB picture, an intensity picture, a depth picture or a combination of one or multiple of each of those. The real world picture data 3 can e.g. be captured with a camera integrated in the measuring system 44b or—in case of a depth image—can be generated from a laser scan, a stereo-camera, a structured light measurement, a RIM-camera, etc.

In a specific embodiment, there can also be physical properties linked to the 3d-model, e.g. thermal radiation. Based on this information, artificial infrared images can be rendered as well and those can be used for training an object detector/classifier that can be applied to real world infrared pictures captured with an infrared camera integrated in the measuring system. The detector/classifier can thereby e.g. be trained to detect and classify potential abnormalities based on virtual rendered images simulating such abnormalities and comprising meta information classifying this abnormality and/or e.g. containing information on potential causes or effects. For example, leakage of pipe-joints or pipe-wall abrasion can be automatically detected by such an approach according to the invention.

Figure 6A:
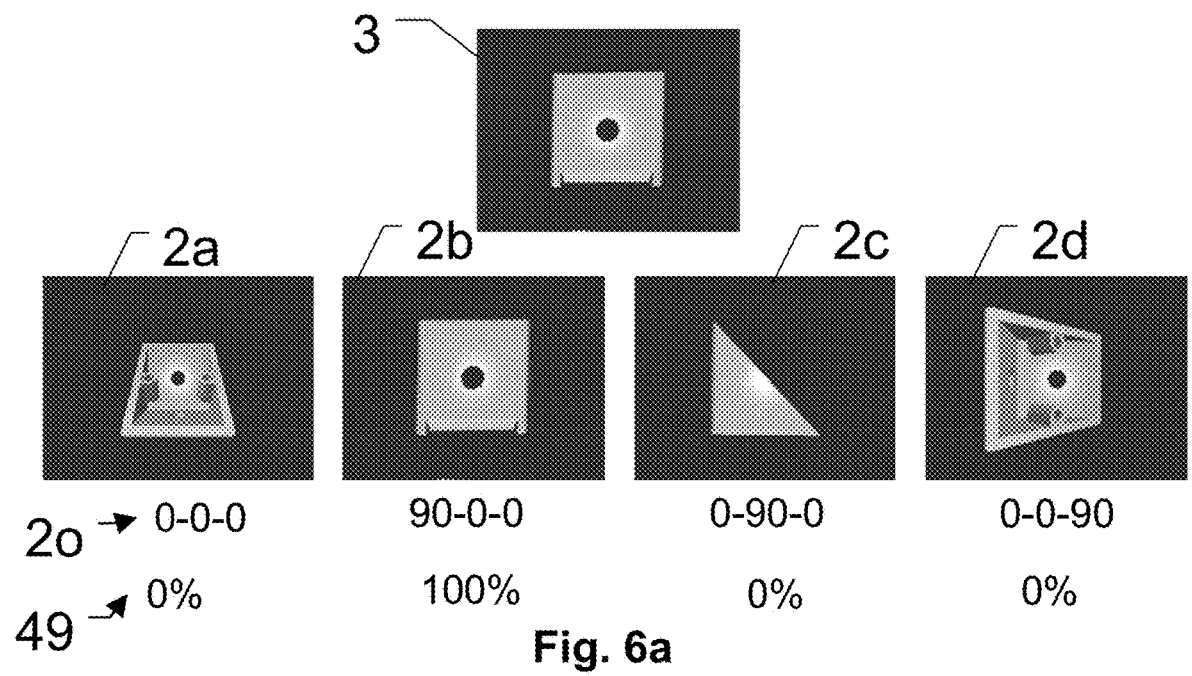
FIG. 6a shows a first example illustrating a real world picture and 3D-models of objects to be identified and/or measured according to the invention with an angular (sub-) classification.

In an embodiment of the invention, the classifier can be trained on training data derived from virtually generated training resources 2a,2b,2c,2d, which are comprising a meta-information 2m or 2o which is comprising information about a position and/or orientation of the 3D-model 1 of the object 1 within the virtual digital 3d-model from which the training data 2a,2b,2c,2d is derived. In the example illustrated in FIG. 6a, such meta information 2m—which can also be a sub-class information for the classifier—is used to represent an orientation 2o of the object 1, which is here indicated by angular values 2o for the three rotational axes in triplet of Roll-Pitch-Yaw values in degrees. This information about e.g. the orientation of the object 1 within the training data 2a,2b,2c,2d—which is known according to the artificial setup of the virtual digital 3D-model—can e.g. be described as different sub-classes 2o within the higher-level class of the object 1 itself. In this example there is a class 0-0-0, i.e. roll=0°, pitch=0°, yaw=0°; a class 90-0-0, i.e. roll=90°, pitch=0°, yaw=0°; etc. which is noted underneath an example of a thereto related virtually generated training data image 2a,2b,2c,2d. Here, the angular interval is 90°, however, it could also be 10° or 1°, or another interval. Such information—which can e.g. also be automatically derived during the generation of the virtual digital 3D-model and/or the deriving of thereof automatically generated training data—can then be provided in a supervised learning approach of a classifier. As one of the possible embodiments among others, an ensemble learning approach can be applied therein.

In an example operating on training data in the visual domain, the 3D-model of an object 1 to be trained is provided in a first orientation 2a, and in this orientation a plurality of numerical rendered images 2a with different illumination and/or environmental conditions are generated—whereof one example is shown. The same is then applied with other orientations, like the shown second 2b, third 2c and fourth 2d orientation, which orientation 2o is numerically indicated below the images as described above. Those rendered images 2 are thereby grouped in a kind of sub-class 2o, which sub class is not only specifying a superior class for the general object according to the type of the object (e.g. a "bracket" 1), but in addition also specifying information on the specific orientation 2o of the object within those rendered images 2a,2b,2c,2d (e.g. a "bracket in 0-0-0 front view" 2a, "bracket in 90-0-0 bottom view" 2b, "bracket in 0-90-0 side view" 2c, etc.). Upon a detection of the object 1 in a real world picture 3, beside the automatic classification of the object 1 itself (to be a "bracket"), there can also be a classification (or sub-classification) of the orientation of the object 1 in real world (to be a "bracket in 90-0-0 bottom view"). This information of the orientation can then be retrieved in the evaluation of a real world picture 3 by the machine learned automatic detection unit and can be provided as additional result from the object detection, e.g. as additional measurement result. In the figure, this is indicated by a classification result 49 which is (to be self-explanatory for the human reader) indicated in a percent value 49. This classification result, regarding the orientation can additionally or alternatively be comprised in an automatic defining of a subsequent real world object measurement, which is to be executed by the instrument, whereby the measurement can then e.g. be optimized for the specific orientation of the object 1.

For example, the object 1 can therein be learned in a discrete set of orientations 2o, e.g. in discrete angular steps of like 90°, 45°, 30°, 15°, 10°, 5°, etc. in one or in more rotational axis, wherein the angular orientation is a learned classifier or sub-classifier for the object 1 in the according sets of training data 2a,2b,2c,2d derived thereof. In the evaluation of a picture 3 comprising the object, the classifier will then result in a classification or sub-classification information, which comprises this orientation information 2o. In this example the classifier outputs sub-class "90-0-0" with a probability of about 100% for the detected object in picture 3 above. This orientation information 2o can be provided as portion of the measurement result for the object and/or can more precisely define subsequent measurements of the object, which can e.g. also used to refine this orientation information to a level of accuracy of the measurement instrument (which will in general result in an orientation information which is more accurate than the sub-classification result 2o).

Figure 6B:
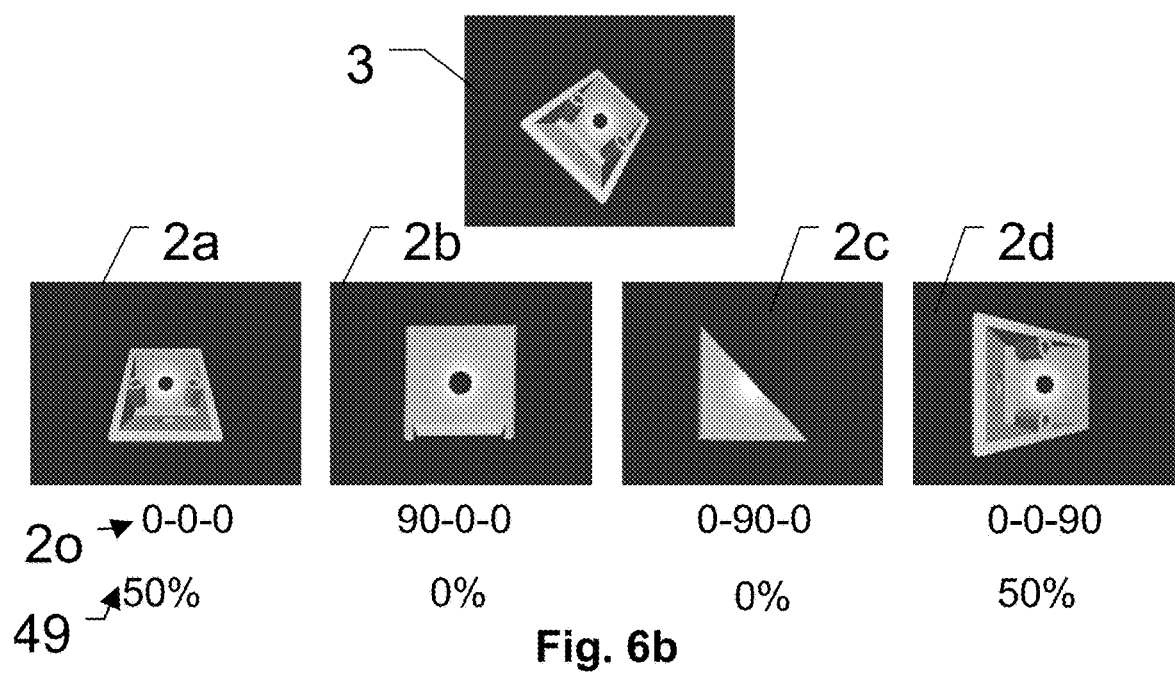
FIG. 6b shows a second example illustrating a real world picture and 3D-models of objects to be identified and/or measured according to the invention with an angular (sub-) classification.

In a specific case of an embodiment as e.g. illustrated in FIG. 6b, the object 1 in the real world picture 3 is in an intermediate orientation in-between two of the learned discrete orientation steps as e.g. indicated by the illustrated samples of the training data 2a,2b,2c,2d for the discrete sets of orientation 2o indicated below the virtually generated training data 2a,2b,2c,2d. In and advanced embodiment of the aspect of the invention discussed above, in many cases an interpolation of the orientation can be established. For example, as shown, a first of the learned orientations 2a of 0-0-0 will fit with a probability or confidence of A %, in this example 50%, and a second of the learned orientations 2d of 0-0-90 will fit with a probability or confidence of B %, in this example 50%. Therefore, an actual orientation can be interpolated in-between those two learned orientations 2a and 2d—in particular dependent on the proportions of A % and B %. Such interpolation can be done in a simple linear manner or according to another interpolation approach, wherein a special embodiment of an interpolation can also be a machine learned interpolation approach. To further enhance the orientation result, it can additionally be verified that the first 2a and second 2d learned orientations are therein at least somehow geometrically neighboring and/or not contradicting or plausible in view of other aspects.

In the shown examples, the result 49 of the classifier is 50% for the trained 0-0-0 orientation class 2a and also 50% for the 0-0-90 orientation class 2d. Those 50% to 50% can then e.g. be interpolated or estimated to be at least roughly an intermediate orientation of 0-0-45—which in fact fits quite well to the view in the evaluated real world picture 3 at the top of the figure.

In another, not shown example with a picture comprising the object with an orientation of roll=30°, pitch=0°, yaw=0°—which is in-between the exemplary learned discrete class-orientations of 90°—an potential classifier output would be class 0-0-0 with about 70% and 90-0-0 with about 30% and all others with about 0% probability. Those probabilities can then be used to interpolate the orientation angle of the object in the image which information can be used to start a measuring process for the object which takes into account this at least roughly assumed orientation.

Although the aspects of meta-information generation, sub-classification and/or interpolation is above shown by way of example of the orientation of the object only, it can be considered to be evident to apply the same principle onto other object-attributes than orientation (like object variants, object configurations, object positions, etc.) as well in the same or in a similar manner.

Figure 7:
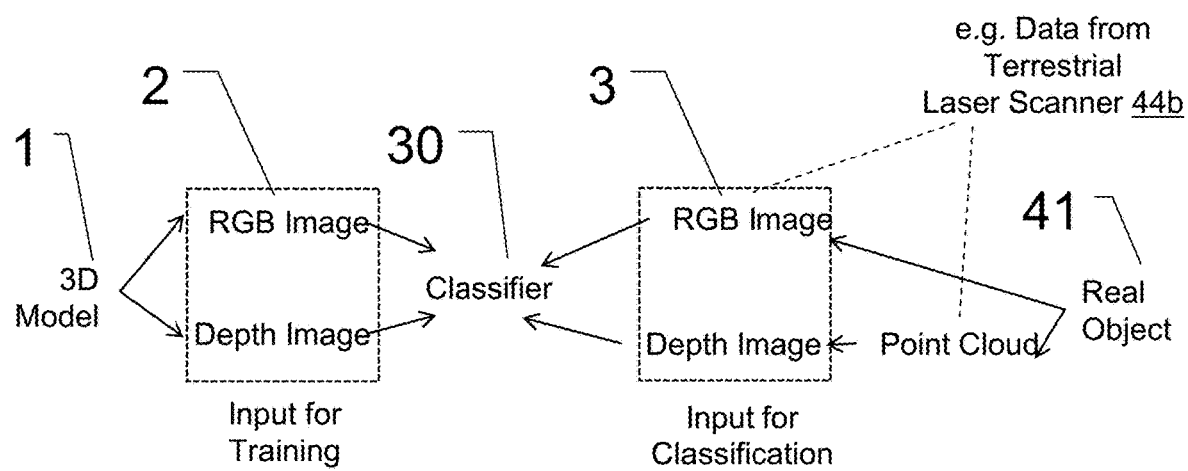
FIG. 7 shows an example of an embodiment of the invention in a block diagram.

FIG. 7, shows the 3D-Model 1 of an object on the left, based on which a large quantity of virtually generated data 2 as input for training for the classifier 30 can be generated, preferably in a substantially automatic process. For example, such artificially generated training data can be embodied as a series of numerically rendered RGB-images and/or numerically rendered depth images, representing different states of the object and of the objects environment, for machine learning the classifier 30. Preferably, an at least partially supervised machine learning approach can be applied, which is deriving the supervision information from the 3D-model and/or the parameters of the numerical rendering—like e.g. environmental conditions, orientations of 3D-model, parameters, proportions from the 3D-model, geometrical information from the 3D-model like axes of the 3d-model, preferred measurements to be taken at this object, predefined fixed size of the object or of a portion of the object, variable portions of the object, expected occurrences for the object (like on the horizontal ground, at a vertical wall, etc.), desirable measurement points at the 3D-model, measurement approaches and routines to measure relevant geometrical properties of this object, etc. which can be provided as corresponding meta data and/or subclass data for the machine learning process. According to the invention those meta data comprises at least an information being relevant for an automated measurement of the object or of a geometric feature of the object by a measuring instrument.

From the application side of the classifier 30, it is feed from the right by information 3 captured of a real world embodiment 41 of the object. Such can e.g. be derived at a measurement instrument such as a coordinate measurement machine, a total station, a terrestrial laser scanner, etc. For example, such input for classification 3 can comprise a real world visual image and/or a point cloud or depth image which comprises the object. The classifier then analyzes this real world data 3 and detects and derives information for the real world object 41 that is depicted in the input for classification 3, preferably such information which is relevant to provide an automatic autonomous measurement of the object 41 by the instrument, a semi-automatic measurement of the object 41 by the instrument with user interaction, or a user-guidance for the user to measure the object 41 by the instrument.

Figure 8:
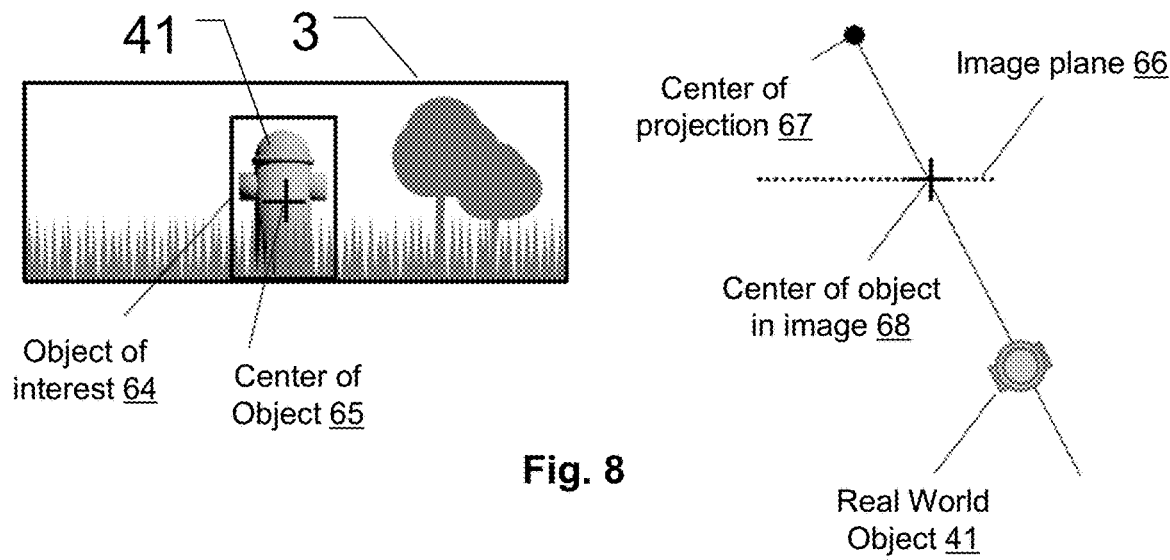
FIG. 8 shows an example illustrating an automatic or semi-automatic real world measurement of real world objects according to the invention.

The left hand side of FIG. 8 shows a real world picture 3, e.g. take by or at a measurement instrument 44,44b,46, which comprises a real world object of interest 41. An automatic detection, e.g. by applying a sliding window approach or an R-CNN, or by another approach is applied to the picture 3, by which a bounding box 64 or another detection indication is obtained, which indicates the location of the object 1 in the picture 3. In this particular example, the centroid 65 of this bounding box 64 can be used for an indication of a direction to the object 1. In other examples also other aspects than the centroid 65 can be used to derive one or more directions to the object, for example as meta information related to the detected object, preferably in form of a preferred measurement direction or a measurement directive or program for measuring this specific detected object 1 by the measurement instrument 44,44b,46. The right hand side illustrates a bird eyes view of a setup as described above. Therein, a camera—which is represented by its shown image plane 66—takes the picture 3 of the object 41. The center 68 of the object in the image can therein e.g. correspond to the center 65 as indicated in the picture 3 at the left, which center can represent a point of the object 1 to be measured. It is shown that this center is in the line of direction from the center of projection 67 of the setup to the object 41. For a 2D image sensor, the same can be applied not only in the vertical but also in the horizontal plane, whereby two directions can be derived, which e.g. can be used to automatically drive a total station to target towards the center of the object 65 and to automatically measure the automatically detected and automatically classified object 41 in an automated manner by the total station (or at least in a semi-automatic procedure where an operator is involved for verification and/or correction of the process).

The size of the bounding box can be identified to correspond to a scale of the object 1 in the picture 3. By considering intrinsic camera parameters, in particular considering the focal length from the scale of the object 1 which has a known size, a distance of the object relative to the camera which is taking the picture 3 can be derived or at least be estimated. Such information about direction, size and/or distance can be provided as rough measurement value, preferably for a more exact measurement of one or more of those values by the instruments measurement units, such a goniometers, tilt sensors, electro-optic or other distance meters, 3D-cameras, etc.

Figure 9:
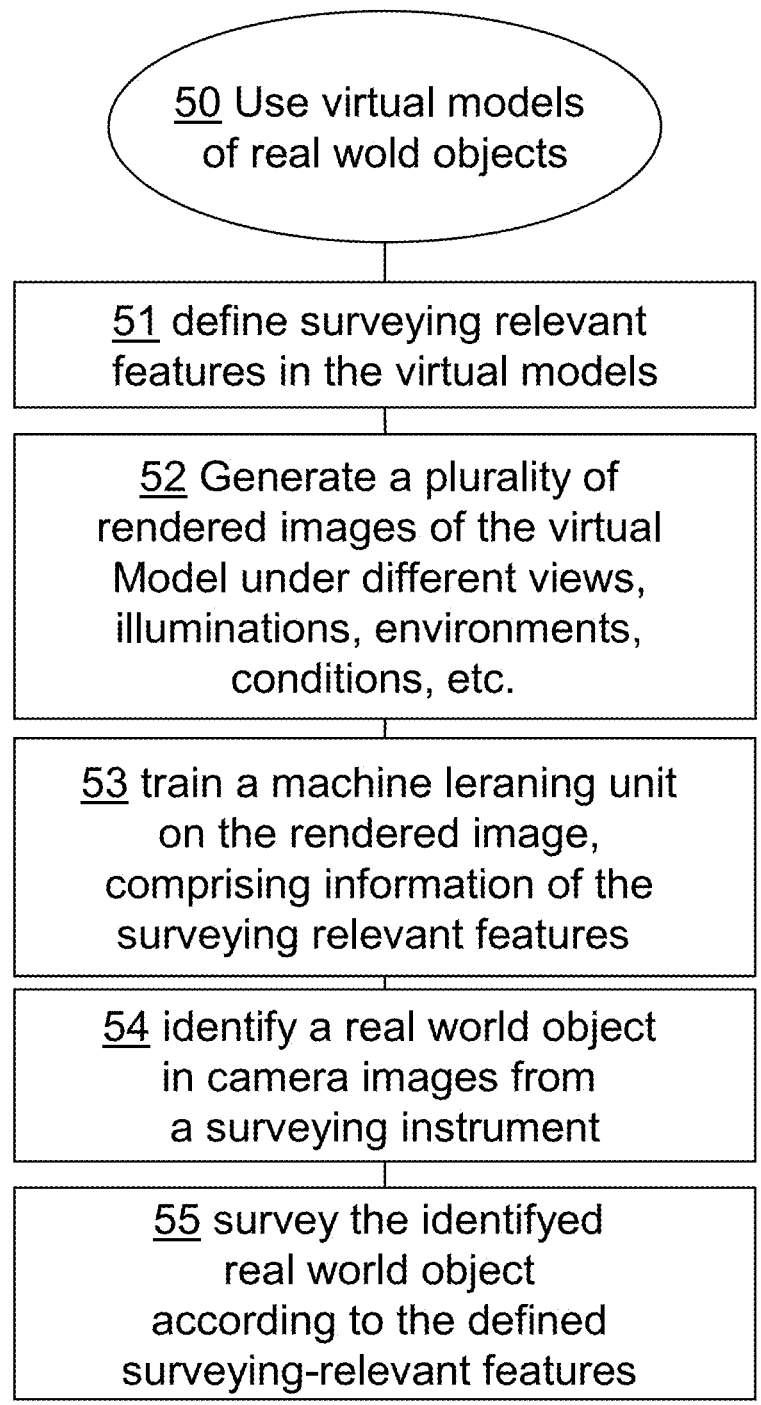
FIG. 9 shows an example of a block diagram illustrating the principle of an embodiment of the method according to the invention.

A method according to the invention can therein be embodied as shown in the example of a basic block diagram of FIG. 9, which is illustrating some basis steps of an exemplary embodiment of the invention.

In block 50, virtual models of real world objects are used, e.g. generated or loaded from a database, in form of 3d-models.

If not already given anyway, in block 51, a defining of surveying relevant features in the virtual models is executed. For example meta information like a name, type, class of the object, but such information can also comprise surveying or measurement relevant geometric information. In many instances such information is already present in (or stored together with) the 3d-model, and thereby accessible.

In block 52, a plurality of numerically rendered images of the virtual 3d-model are generated, in particular under different views, illuminations, environments, conditions, etc. This can also involve variation of the 3d-model, supplementing backgrounds and foregrounds, etc.

In block 53, a training of a machine learning unit on the rendered images is done, wherein also the meta information and in particular information of the surveying relevant features is comprised. Such machine learning can e.g. comprise a training of a neural network. Thereby, a classifier can run on basis of this trained data. The trained data respectively the result thereof, which is the configuration of the classifier, can be stored. Above steps can be done in an office environment without necessarily requiring a surveying instrument to be present, e.g. also on a general purpose computer or therefore specifically dedicated machine learning computer.

The following blocks can be executed in the field, in particular by a classifier at the surveying instrument or a thereto linked surveying computer, which is configured according to above machine learning according to the invention.

In block 54, an identifying of a real world object in real world camera pictures taken at the surveying instrument is done by said classifier. Thereby e.g. a detecting and identifying of real world objects within the image which are corresponding to trained objects is established and the corresponding meta information recovered.

In block 55, a surveying of the before identified real world object is done, in particular according to the meta information defined surveying-relevant features. Such can in particular be done fully automatic or semi automatic with user-interaction.

An example of an embodiment of a workflow according to the invention for a CMM can comprise at least the following. A CMM controller, e.g. a computer or microprocessor controlling the CMM, loads a 3D-model (e.g. a CAD-file) of an object to be processed. On basis of this 3D-model, the CMM controller generates numerically rendered training data and trains the detector and/or classifier. Then a camera at the CMM takes one (or optionally, but not mandatory, more) picture of the measurement volume of the CMM, in which the corresponding real world object to be measured is placed. The detector and/or classifier automatically detects and identifies the object, whereupon the CMM can automatically measure the object. For example, it can automatically measure and compare those dimensions indicated in the CAD file. The resulted detector and/or classifier can optionally also be stored for further usage, e.g. in a database of known objects.

In particular it is thereby not mandatory to take a large number—like tens or hundreds or even more—real world camera pictures from different poses and/or with different illuminations. The present invention can optionally also involve real world pictures as additional training data—e.g. for refining the classifier to the actual environment, but the basic training takes place automatically based on rendered images.

A similar embodiment of a workflow scenario can be applied to a surveying or metrology instrument. Optionally, in other embodiments, also the rendered images can be generated externally from the surveying or metrology instruments controller and then be loaded, or a detector and/or classifier (respectively its configuration) which was externally pre-trained based on virtual images, can be loaded by the surveying or metrology instrument. Another option of an embodiment of the invention is an online link of a field measurement instrument to a server-computer that comprises a database of known objects, 3D-models, and which can have more computational power and/or storage than the field instrument. For example, a real world picture taken by the field instrument can be transmitted to the server-computer, at which the automatic detecting and classifying according to the invention is executed, and the result of such, (e.g. detected and identified object information, measurement instructions and/or programs, etc.) is provided online to the field instrument for an automatic or semi-automatic measurement. Optionally, also an online provision of pre-trained automatic classifiers and/or detectors (respectively their specific configurations) for a specific instrument and/or the instruments actual environment can be an embodiment of the invention.

In an embodiment, the automatic detection is configured to detect known objects in a real world picture 3. The automatic detection can in other words generally be described as an automatic calculation applied to a picture 3, which calculation derives if a known object is present in the picture. To establish such, a detection is machine learned on training data. If a known object is present, it is also derived at which coordinates or location in the picture 3 the known object is found, and optionally also at which scale the known object is depicted. In other words a location information for the known object within the picture can be derived, wherein also different orientations of the object, partial occlusions, etc. can be considered. For example, the detection can result in a region of interest or a bounding-box that comprises the object, e.g. given in picture coordinates. This region of interest or bounding box—respectively its image content—can then be passed to the automatic classifier.

In an embodiment, the automatic classifier is configured to identify a known object within picture data, in particular for an identifying with an assigning of the known object in the picture 3 to at least one class of known objects. The automatic classifier can therein identify the object (e.g. which object is given within a section of the picture 3 that is defined by the region of interest or bounding box from above) to be one of the learned objects and to result in a classification of the object, e.g. with a providing of a class or type information for the object according to a previously learned classification from training data.

There are several computational algorithms to achieve such a detection and/or classification by means of a machine learned system. Some of those approaches also provide a combined detection and classification in a single procedure. For example such a machine learned system can comprise rule-sets, neuronal networks, one or more layers, artificial neurons with one or more properties, arranged hierarchies or groupings, etc. in various arrangements, configured to be machine learned for a detection and/or classification task based on training data. Preferably, the detection and/or classifying can comprise an evaluation of a likelihood or confidence information value regarding the presence and/or location of a known object in the picture 3.

A skilled person is aware of the fact that details, which are here shown and explained with respect to different embodiments, can also be combined with details from other embodiments and other permutations in sense of the invention.

What is claimed is:

1. A method for automatic surveying or measuring of a real world object by a surveying or metrology instrument embodied as tachymeter, total station, geodetic laser scanner, 3D scanner, coordinate measurement machine, articulated arm, or laser tracker, the surveying or metrology instrument comprising a camera and a measurement unit with position determining means and a distance meter for determining a direction and distance to a measurement point, the method comprising:
    acquiring a picture by the camera of the surveying or metrology instrument, which picture comprises the real world object which is to be surveyed or measured;
    automatic detecting and classifying of the real world object within the picture; and
    automated loading and starting of a corresponding measurement program for measuring a direction and a distance to a measurement point of the real world object by the position determining means and the distance meter of the measurement unit upon the detecting and classifying of the real world object, for determining a location or a geometrical property of the real world object,
    wherein:
        the automatic detecting and classifying is done with a classifier based on a classification-model acquired by machine learning, the machine learning being based on machine learning training data comprising a virtual digital three-dimensional (3D) model, representing the real world object and comprising meta information of this 3D model, wherein for the machine learning aging effects or structural deformation are also considered, and the meta information provide measurement relevant information for the real world object to be taken into account in a measurement by the measurement unit.

2. The method according to claim 1, wherein the meta information is comprising at least a class-, type- and name-identifier for the real world object.

3. The method according to claim 1, wherein the machine learning training data is comprising a plurality of numerically rendered images derived from the 3D model.

4. The method according to claim 3, further comprising:
    rendering the numerically rendered images from the 3D model with a virtually simulating environmental conditions of the 3D model.

5. The method according to claim 4, wherein the environmental conditions comprise at least one of: a viewing angle, an illumination, a shading, a foreground, a background, a fog, or a scale.

6. The method according to claim 1, wherein the metadata comprises an orientation information of the object in the virtual training data.

7. The method according to claim 1, wherein the real world picture comprises 3D information and the numerically rendered images comprise 3D information.

8. The method according to claim 1, wherein the 3D model and the resulting learning data comprise the meta information with at least one surveying-feature, wherein the surveying or metrology instrument is automatically measuring at least one of the at least one surveying features.

9. The method according to claim 8, wherein the at least one surveying-feature comprises at least one of an axis, symmetry, dimension, distance, angle, diameter, depth, relative proportions, geometric dependency, scalability.

10. The method according to claim 3, wherein the rendered images depict a generic geometrical feature from the 3D model, representing a generic geometrical feature of a plurality of real world objects and comprises meta information on surveying this generic geometrical feature, in particular wherein an untrained real world object is automatically measurable based on the automatic detecting and classifying of one or more of the generic geometrical features.

11. The method according to claim 1, further comprising providing an autonomous measurement mode, which automatically measures geometrical features of a real world object automatically identified by the classifier in the real world pictures, according to trained meta information from the virtual 3d-model.

12. A non-transitory computer program product comprising program code stored on a machine-readable medium, for executing a method according to claim 1.

* * * * *